Oct. 8, 1940.　　　H. L. WILLIAMS　　　2,217,036
FILM REELER FOR CAMERAS
Filed Dec. 18, 1937　　　2 Sheets-Sheet 1
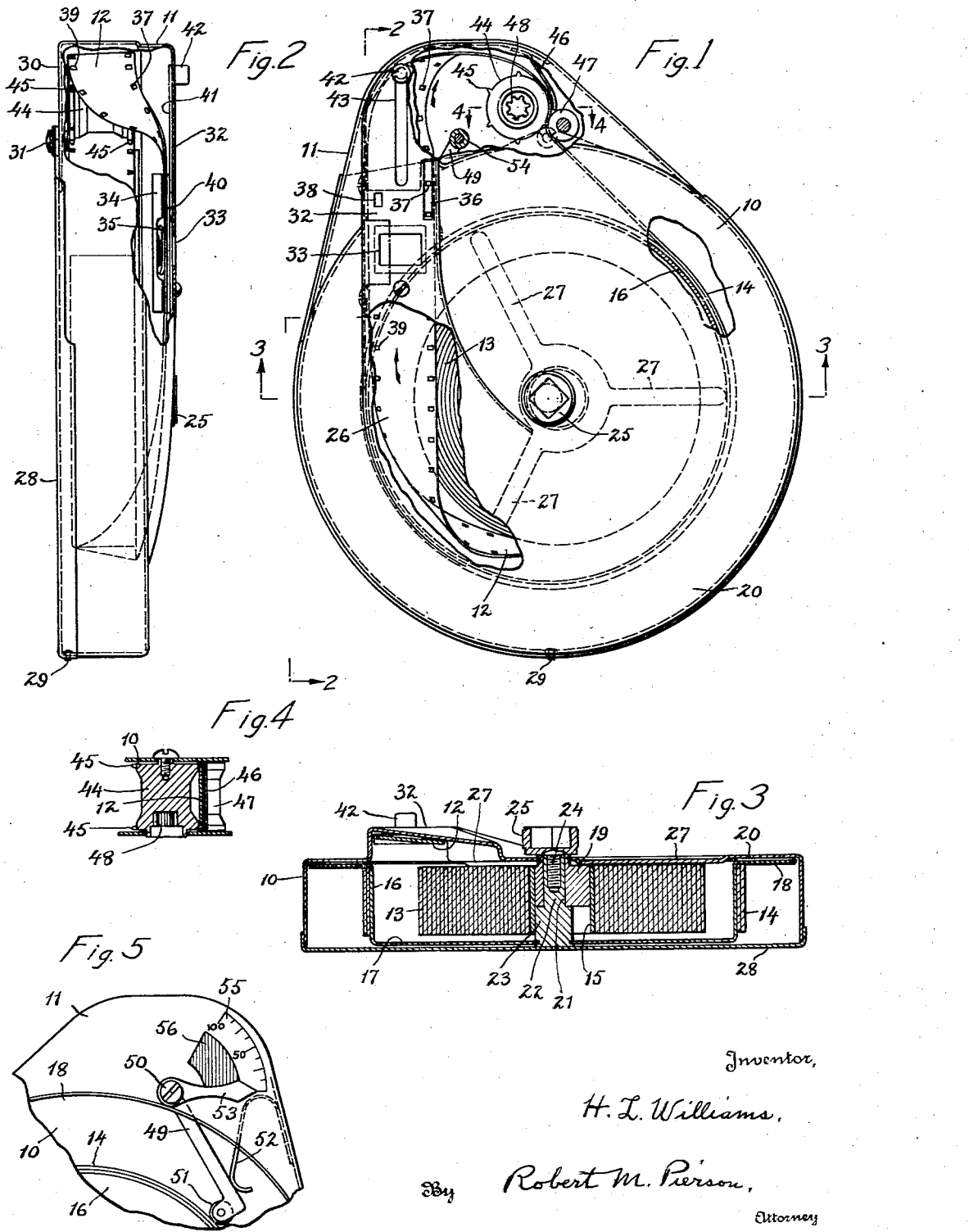
Inventor,
H. L. Williams.
By Robert M. Pierson,
Attorney

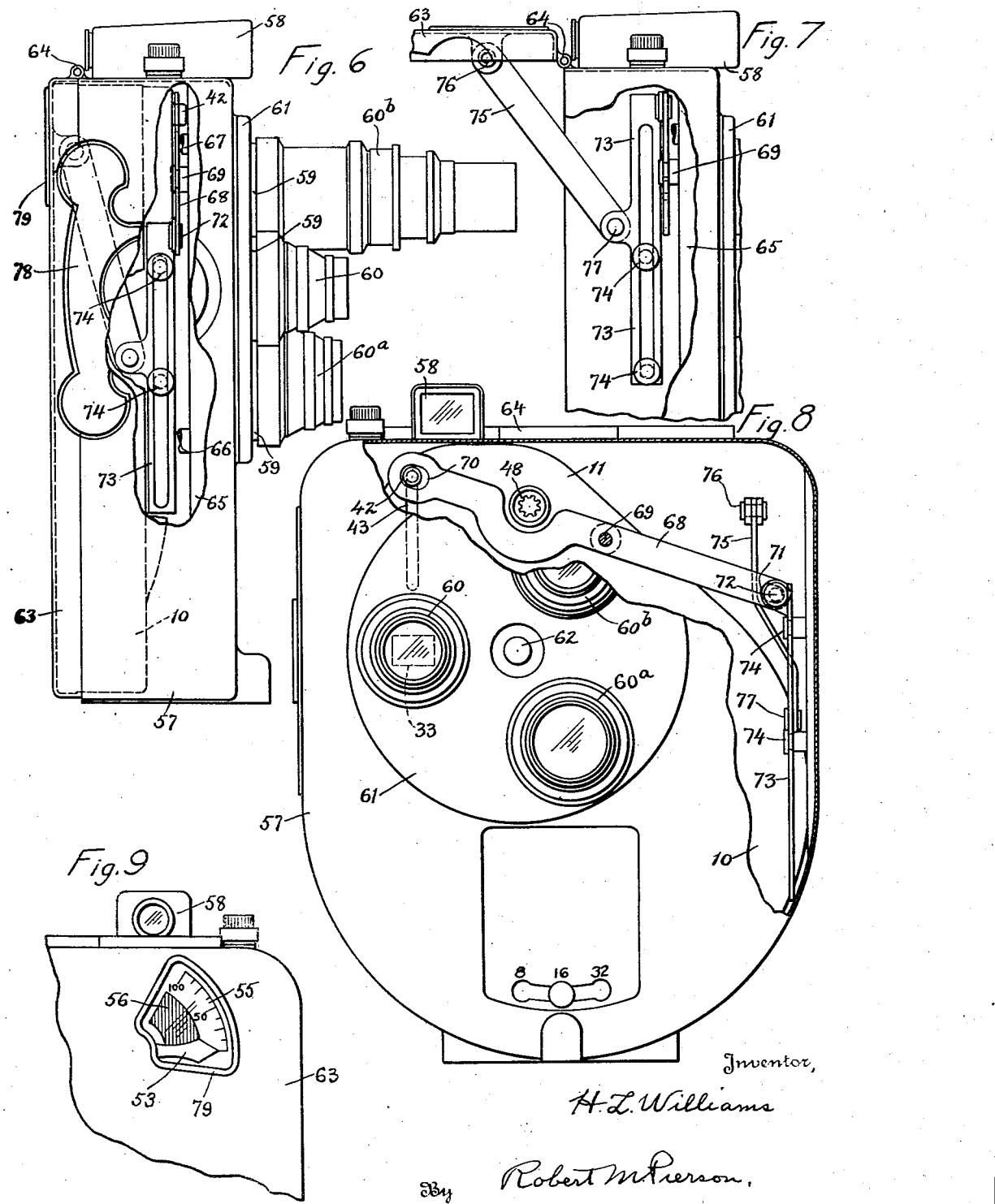

Patented Oct. 8, 1940

2,217,036

UNITED STATES PATENT OFFICE 2,217,036

FILM REELER FOR CAMERAS

Herbert Lloyd Williams, Akron, Ohio

Application December 18, 1937, Serial No. 180,604

7 Claims. (Cl. 88—17)

This invention relates to reeling devices such as film-strip handling apparatus for motion picture cameras, especially those of the general type disclosed in my Patent No. 2,120,724, dated June 14, 1938, wherein the rolls or reels are journaled on a casing, one of them surrounds the other for the sake of compactness, and the film is guided to pass from the outer periphery of the supply roll, out of the plane of the rolls and back into said plane, onto the outer periphery of the take-up roll, and is adapted to be exposed at a suitable point in the course of its passage between the rolls.

Among the objects of the present invention are, first, the attainment of a broadside exposure, as by having the lens window in the wall of the film guide bridge, to expose the film on its diversion loop between the rolls, enabling the camera to be conveniently hung about the user's neck and more quickly sighted and operated; secondly, a better utilization of available space in the roll holder, for guiding the film between the rolls with a minimum of resistance, attainable by rotating the rolls on different centers and also twisting the film in a particular manner; and thirdly, providing a simpler and cheaper arrangement of the outer or recessed roll, such as the take-up reel.

Of the accompanying drawings, Fig. 1 is a front broadside view, partly broken away and in section, showing a preferred form of my improved film magazine or roll holder.

Fig. 2 is a left-hand edge view thereof, partly broken away and in section approximately on the line 2—2 of Fig. 1.

Fig. 3 is a horizontal section looking upward, approximately on the line 3—3 of Fig. 1.

Fig. 4 is a detail section on the line 4—4 of Fig. 1.

Fig. 5 is a fragmental rear elevation of the upper portion of the roll holder, without its cover, showing the associated film-identifying and footage indicators.

Fig. 6 is a left-hand edge view of the camera, with the casing partly broken away to expose interior parts, and certain of said parts partly broken away.

Fig. 7 is a left-hand edge view of upper parts shown in Fig. 6, with the hinged camera door or lid in open position.

Fig. 8 is a front elevation of the camera, with its casing partly broken away and the hinged lid in a closed position.

Fig. 9 is a rear upper right-hand corner view of the camera showing the film indicators and observation window therefor.

In the drawings, 10 is a film magazine casing of generally circular edge contour throughout the major portion of its circumference, and having a minor upwardly projecting lobe or segment 11 for partial accommodation of the inter-roll film loop, driving and guiding elements and adjacent parts. 12 is the film strip, disposed in a pair of variable coils 13, 14, one within the other, and an intervening diversion loop where the film passes from one coil to the other. The feed might be in either direction, but is preferably from an inner supply roll, represented by the loosely journaled sleeve 15 supporting the coil 13, to a surrounding take-up reel 16 in the form of a cup-shaped drum 17 constituting a receptacle for the supply roll and coil, and provided with only a single marginal flange 18 at the front edge thereof to help guide the film in winding into the coil 14 upon said take-up reel. This reel may be cheaply formed from sheet metal by a pressing or spinning operation.

The supply roll 15 turns upon a cylindrical stud 19 whose stem is centrally fastened in the front wall 20 of the casing 10, and is bored with a through aperture 21 for the reduced journal 22 of a driving stem 23 whose larger or rear end is fastened to the rear end wall of the take-up reel 16, the front end of said stem having a detachable driving screw 24 whose head 25 is formed with a square socket to receive the complemental driving-shaft end of the usual spring motor on the camera, these driving parts interfitting when the magazine is placed in the camera box. The centers of rotation of the respective rolls are eccentrically placed, that of the supply roll 15, on the stud 19, being offset in a direction away from or opposite to the anterior portion of the diversion loop 26 of the film strip 12 where it passes between the two rolls. This eccentric relation of the roll axes provides the maximum room, within the available space, for a twisting or turning of the film from one plane into another without cramping or excessive friction. Shallow radial bars 27 are inwardly formed by a pressing operation on the front wall 20 of the casing to reduce its contact surface against the supply coil 13 and limit the turning friction of said coil.

The rear wall of the casing 10, except for a part thereof on the lobe 11, is formed by a shallow telescopic cover 28, having a hole in its lower rim to receive a fixed pin 29 on the casing body and secured to the lobe front wall 30 at its upper edge by a pair of screws 31, of which one is shown in Fig. 2. Removal of this cover exposes an opening in back of the casing through which, on removal of the driving screw 24, the supply roll 15 and the take-up reel 16, together with the latter's spindle 23, may be removed and inserted.

On the front wall 20 of the casing 10 is formed a guide passage or bridge 32 spanning the rim of the take-up reel 16 and provided with a wide mouth or flaring entrance, substantially as disclosed in my aforesaid application Serial No. 105,031, except that in this case the exposure is made through a window on this bridge before the film returns to the plane of the rolls, instead of through one of the narrower edge walls of the casing.

33 is the exposure window in the front wall of the bridge 32, aligning with the camera lens, said bridge and window overlying the take-up reel 16 in an axial direction to obtain the utmost compactness, and 34, 35 are respectively the usual guide plate and spring-backed friction presser plate for yieldingly holding the film in a flat position while passing said window. 36 is a slot in the bridge wall for receiving the end of the usual reciprocating feeder pawl or claw which engages in the holes 37 on one margin of the film strip, and 38 is an aperture in said wall, registering with the holes 39 on the opposite margin of the strip, for receiving the end of the feeder check pawl. On the front side of the film, between a backing plate 40 and the front wall of the bridge 32, is the usual thin slide 41, having at its upper end an external operating stud 42, whose stem passes through a vertically elongated slot 43 in said wall, for closing the exposure window 33 and the feed apertures 36, 37 when the film magazine is out of the camera, and opening them when said magazine is contained in the camera and ready for picture-taking.

In passing from a position in the supply coil 13, edgewise of the casing wall 20, into an exposure position at right angles, flatwise thereof, in the bridge 32, the film executes a right-hand helical quarter-turn instead of the left-hand turn disclosed in my former application Serial No. 105,031, and in passing back into the plane of the rolls after exposure it executes an opposite or left-hand quarter-turn, as seen in Figs. 1 and 2. In the posterior return or upper part of the diversion loop, since the film is positively advanced by the feeder pawl operating through the slot 36, and also by motor drive applied to the spindle of the take-up reel, it could be properly fed without additional feeding or roll guiding, but in order to assist its passage through the diversion loop, I prefer to employ a positive feeder such as the sprocket wheel 44 journaled in opposite walls of the casing and having two rows of teeth 45 engaging in the holes 37 and 39 on the margins of the film strip, together with a guide plate 46 and a presser roll 47 for holding said strip against the wheel. This feeder is compactly located in the casing lobe 11. The front end of the sprocket wheel is formed with an internally toothed socket or jaw clutch member 48 detachably engageable, by the act of mounting the magazine casing in the camera box, with the complemental coupling end of a suitable geared shaft of the spring motor in the camera. Another motor shaft of the camera, for operating the take-up reel 16, is frictionally driven in a familiar manner, to compensate for varying diameter of the coil 14 on said reel.

A further device, partly located in and upon the casing lobe 11, is the combined footage indicator and film identifier whose rear face view is represented in Fig. 5. The footage indicator comprises a rocker arm 49 pivoted at 50 on the casing, having a roller 51 at its free end, engaging the take-up coil 14 of the reel 16, against which it is yieldingly pressed by a light spring 52, and an external pointer 53 on the rear end of its hub sleeve 54, coacting with a segmental scale 55 which is graduated to show the amount of exposed film on the take-up reel. The film identifier is, for example, a segmental label 56, conveniently located on the back wall of casing lobe 11 concentric with the dial segment 55, under the pointer 53, and having a distinctive color, varying with the particular film species, to show what one of the various kinds of film strip, differentiated according to the nature of their sensitive surface, the magazine contains.

The described holder or magazine may conveniently be unloaded and reloaded and its exposed film developed at the film factory, in a distributing system where the customer purchases a new film in a holder of this character. To charge the magazine, its back cover 28 and the front spindle screw 24 are removed, the take-up reel 16 taken out, together with the exposed film wound thereon, if any, upon retraction of the footage arm 49 to clear the flange 18, the empty supply roll or sleeve 15, if present, is removed, a fresh supply roll bearing an unexposed film coil 13 is mounted on the journal stud 19 and its exposed or dummy pilot end threaded through the guide bridge 32 and over the feeder wheel 44, said pilot end is attached in a suitable manner to the drum surface of an empty take-up reel 16, as by means of a friction clip not here shown but disclosed in my aforesaid application Serial No. 105,031, while said reel is out of the casing, the reel then inserted in the casing 10 with its spindle journal 22 projecting through the opening in stud 19, the retaining screw 24 attached and the cover 28, with its attaching screws 31, replaced. During this charging, the stud 42 of the cover slide 41 will be at the bottom of its slot 43, causing the window opening 33 and adjacent apertures to be closed on the inner side. The roll holder or magazine is then ready for insertion in the camera.

Figs. 7 to 9 illustrate, in part, a suitable camera for receiving the above described film magazine, and a preferred mode of combining the two. 57 is a camera box shaped and sized to compactly receive the holder casing 10, said box having an edge contour which is substantially U-shaped at the bottom and sides and flat on the top, where it is provided with one or more sighting devices such as the horizontal finder 58 located substantially over the exposure window 33 of the magazine. The magazine lobe occupies substantially the right-hand upper corner of the camera box, looking forward. On the upper front of the camera, the latter is provided with a holder 59 for a screw-coupled lens unit 60 aligning with the exposure window 33, and there may be a number, such as a total of three, of such holders, and additional alternative lenses 60ᵃ, 60ᵇ, the last-named being represented as a telephoto lens, all mounted upon a turntable or turret 61 which is pivoted at 62 to turn on the camera front in a familiar manner. The multiple-lens turret is not essential.

The magazine 10 is inserted and removed through an opening in the back of the camera box body, coextensive with the area of the latter and normally covered by a door or lid 63 hinged at its upper edge. The magazine occupies substantially the rear half of the camera box and the front half is devoted to the spring motor, gearing, etc., designated generally at 65 in Fig. 6, the construction of which is well known and not illustrated in full detail. Said motor includes a main shaft 66 and an auxiliary shaft 67 whose rear ends couple with the respective shaft socket members 25 and 48 of the take-up reel 16 and the feeder sprocket 44.

For automatically operating the shutter slide 41 by the movements of the hinged cover 63, there is provided a lever 68 pivoted at 69 on the rear side of the motor unit 65, one arm of said lever being formed with an elongated aperture 70 for receiving the operating stud 42 of said slide, and the other arm being formed with a similar aperture 71 to receive a pin 72 which is carried by an ear at the upper end of a slotted flat bar 73, the latter being guided by a pair of studs 74 for vertical movement adjacent to one of the narrow sides of the camera box 57. A link 75 connects by pivots 76, 77 with ears on the inner side of the hinged lid 63 and the slide bar 73 respectively, for communicating the movement of the former to the latter. A full opening of the lid 63 to the right-angled position shown in Fig. 7 raises the bar 73 to its upper limit and swings the lever 68 to depress the end of the lever which is formed with the aperture 70 and correspondingly depress the stud 42 and its connected shutter slide 41 to the lower limit of the latter's movement, thereby automatically closing the exposure window 33. Opposite movements occur when the lid 63 is closed.

The camera box is provided with the usual hinged key 78 for winding the spring of its motor. As best seen in Fig. 9, the lid 63 is provided, at the right-hand upper corner thereof as viewed from the rear, with a window 79, whose aperture registers with the footage pointer 53, the scale 55 and the film identifying label 56, through which these elements may be observed to indicate the amount of film which has been exposed and the character of said film corresponding to the color of the label or other data thereon.

From the foregoing, it will be evident that my invention includes a simple and very compact film holder or magazine adapted for detachable mounting in a camera box and for broadside exposure of the film through a selected lens, as distinguished from the edgewise exposure heretofore commonly employed. This permits the camera to be conveniently hung by a strap around the user's neck, in front of the chest, where it can be more quickly reached, sighted upon an object and operated, than prior types of motion picture cameras. The invention further affords the additional advantages mentioned in the statement of objects.

It will be understood that my invention is not wholly limited to the illustrated arrangement wherein the film supply and take-up rolls are mounted in a magazine or holder insertible in the camera and removable therefrom as a unit, for reloading at the factory, but may be otherwise embodied, and the described construction is also capable of variation in other respects.

I claim:

1. A film receptable for motion picture cameras comprising a relatively-flat, light-tight casing having relatively-broad front and rear and narrow edge walls and an exposure opening formed in the front wall thereof, strip-end coil means in said casing for unwinding and winding the strip by rotation in the plane of the casing, including a take-up reel underlying said exposure opening, and intermediate guiding means for twisting and diverting the strip to pass said opening on the inner side of the front wall axially over the take-up reel.

2. Film-strip reeling and exposing means for motion picture cameras comprising supply and take-up rolls, one of which surrounds the other, and guide means having an exposure window overlying the take-up roll, to divert the strip for broadside exposure, out of the plane of the rolls.

3. A film magazine for motion picture cameras comprising separate film-strip supply and take-up rolls, the latter of which surrounds the former, and a casing enclosing said rolls, having a guide bridge formed with a window, overlying the take-up roll, to divert the film for broadside exposure, in an inter-roll loop, out of the plane of the rolls.

4. Apparatus according to claim 3 in which the film strip makes a right-hand helical quarter-turn in passing between the inner roll and the guide bridge.

5. Apparatus according to claim 3 in which the rotation axis of the inner roll is eccentrically offset from that of the outer roll, on the side away from the adjacent mouth of the guide bridge.

6. Film-strip reeling apparatus comprising supply and take-up rolls, one within the other, inter-roll strip guiding means, a journal spindle attached to the outer roll, and a fixed stud journaling the inner roll, said stud being formed with a bearing aperture for the spindle, offset from the central axis of the stud on the side toward the adjacent end of said strip guiding means.

7. A film-strip magazine for motion picture cameras comprising a casing body having a front wall and an opposite loading aperture, a movable cover over said aperture, a cup-shaped reel or drum rotatably supported on said front wall and having only a single outward radial flange, located on its forward edge and forming the front side of an annular strip-coil space whose rear side is formed by the cover, a strip roll within said reel, and means for guiding the film strip between said roll and reel.

HERBERT LLOYD WILLIAMS.